United States Patent
Iwai et al.

(10) Patent No.: US 12,551,593 B2
(45) Date of Patent: Feb. 17, 2026

(54) X-RAY DIAGNOSTIC APPARATUS AND METHOD OF CONTROLLING X-RAY DIAGNOSTIC APPARATUS

(71) Applicant: CANON MEDICAL SYSTEMS CORPORATION, Otawara (JP)

(72) Inventors: Haruki Iwai, Otawara (JP); Naoki Yamada, Utsunomiya (JP); Hiroki Tonotsuka, Otawara (JP); Takehito Tomaru, Otawara (JP); Naoya Fujita, Otawara (JP); Takanori Soutome, Nasushiobara (JP); Takahiro Kuroki, Nasushiobara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 583 days.

(21) Appl. No.: 18/057,405

(22) Filed: Nov. 21, 2022

(65) Prior Publication Data
US 2023/0165992 A1     Jun. 1, 2023

(30) Foreign Application Priority Data
Nov. 30, 2021   (JP) .................................. 2021-194836

(51) Int. Cl.
*A61L 2/24*     (2006.01)
*A61B 6/00*    (2024.01)
*A61B 6/04*    (2006.01)
*A61L 2/10*    (2006.01)

(52) U.S. Cl.
CPC .............. *A61L 2/24* (2013.01); *A61B 6/0407* (2013.01); *A61B 6/547* (2013.01); *A61L 2/10* (2013.01); *A61L 2202/14* (2013.01)

(58) Field of Classification Search
CPC . A61L 2/10; A61L 2/24; A61B 6/0407; A61B 6/547
See application file for complete search history.

(56) References Cited

FOREIGN PATENT DOCUMENTS

JP    2005-198761 A    7/2005
KR   20150046696 A  *  4/2015    ............... A61L 2/10

OTHER PUBLICATIONS

English translation of KR-20150046696-A (Year: 2015).*

* cited by examiner

*Primary Examiner* — Sean E Conley
(74) *Attorney, Agent, or Firm* — Oblon, McClelland, Maier & Neustadt, L.L.P.

(57) ABSTRACT

An X-ray diagnostic apparatus according to an embodiment includes a radiographic unit, a movable unit, and processing circuitry. The radiographic unit performs radiography. The movable unit is provided in the radiographic unit and is movable to plural positions. The processing circuitry moves the movable unit to a position where the movable unit and a disinfection apparatus that performs disinfection have a predetermined positional relation to each other.

11 Claims, 7 Drawing Sheets

| STEP | POSITION | DISINFECTION TIME PERIOD (MIN) |
|---|---|---|
| 1 | A | 30 |
| 2 | B | 60 |
| 3 | C | 20 |
| 4 | D | 10 |
| 5 | E | 15 |
| 6 | F | 20 |

# X-RAY DIAGNOSTIC APPARATUS AND METHOD OF CONTROLLING X-RAY DIAGNOSTIC APPARATUS

CROSS-REFERENCE TO RELATED APPLICATIONS

This application is based upon and claims the benefit of priority from Japanese Patent Application No. 2021-194836, filed on Nov. 30, 2021, the entire contents of which are incorporated herein by reference.

FIELD

Embodiments described herein relate generally to an X-ray diagnostic apparatus and a method of controlling the X-ray diagnostic apparatus.

BACKGROUND

Importance of measures for preventing infectious diseases has been widely understood in recent years, due to the COVID-19 pandemic, for example. For example, as a measure for preventing infectious diseases, for example, the couch in an X-ray diagnostic apparatus is automatically cleaned with cleaning tools including a disinfectant, every time imaging is finished.

DETAILED DESCRIPTION

An X-ray diagnostic apparatus according to an embodiment includes a radiographic unit, a movable unit, and processing circuitry. The radiographic unit performs radiography. The movable unit is provided in the radiographic unit and is movable to plural positions. The processing circuitry moves the movable unit to a position where the movable unit and a disinfection apparatus that performs disinfection have a predetermined positional relation to each other.

The X-ray diagnostic apparatus according to the embodiment will be described hereinafter while reference is made to the drawings. A case where the X-ray diagnostic apparatus according to the embodiment is a general radiographic apparatus will be described as an example. Components in the embodiment hereinafter and assigned with the same reference sign will be assumed to operate similarly to each other and redundant explanation thereof will be omitted as appropriate.

Figure 1:
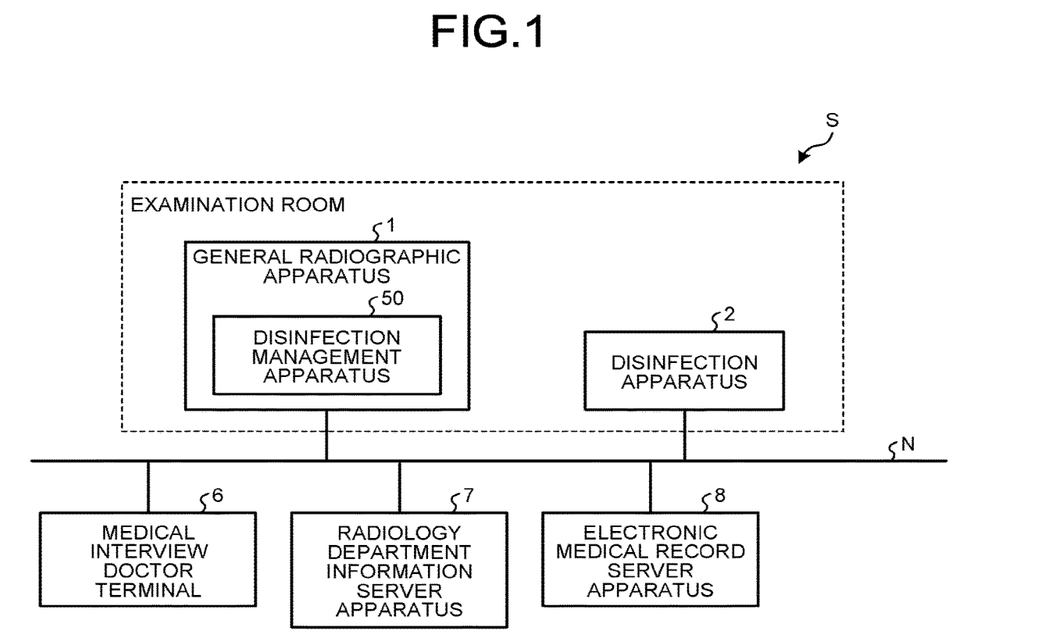
FIG. 1 is a diagram illustrating a hospital information processing system including an X-ray diagnostic apparatus according to an embodiment.

FIG. 1 is a diagram illustrating a hospital information processing system including the X-ray diagnostic apparatus according to the embodiment. As illustrated in FIG. 1, a medical information processing system S includes: a general radiographic apparatus 1 including a disinfection management apparatus 50; a disinfection apparatus 2; a medical interview doctor terminal 6; a radiology department information server apparatus 7; and an electronic medical record server apparatus 8.

These apparatuses included in the medical information processing system S are able to communicate with one another via a network N. The network N may be any one of a wire communication network, a wireless communication network, and a network having a mix of wire communication and wireless communication.

The general radiographic apparatus 1 and the disinfection apparatus 2 are installed in, for example, an examination room in a hospital. The examination room is space (a room) where examinations using the general radiographic apparatus 1 are performed, and is sometimes called an imaging room. The medical interview doctor terminal 6 is installed in space (typically, in a consultation room) where a medical interview doctor interviews a patient about the patient's condition. The radiology department information server apparatus 7 and the electronic medical record server apparatus 8 are typically installed in the hospital.

However, for example, the radiology department information server apparatus 7 and the electronic medical record server apparatus 8 may be installed in any environment outside the hospital, as long as that environment enables communication via the network N between: the radiology department information server apparatus 7 and the electronic medical record server apparatus 8; and the apparatuses included in the medical information processing system S.

On the basis of examination order information from the radiology department information server apparatus 7, the general radiographic apparatus 1 executes radiography of a subject in response to operation by a technician, for example. On the basis of the radiography, the general radiographic apparatus 1 generates an X-ray image, and transmits the X-ray image generated, together with the examination order information, to a server apparatus of picture archiving and communication systems, also referred to as "PACS", not illustrated in the drawings.

The disinfection management apparatus 50 executes management related to disinfection of the general radiographic apparatus 1. The disinfection management apparatus 50 also controls the disinfection apparatus 2 when the disinfection of the general radiographic apparatus 1 is executed.

The disinfection of the general radiographic apparatus 1 may include, not only disinfection of the general radiographic apparatus 1 itself, but also disinfection of the examination room where the general radiographic apparatus 1 has been installed. Furthermore, for example, the disinfection of the examination room where the general radiographic apparatus 1 has been installed may include: disinfection of the air in the examination room; disinfection of the walls and ceiling of the examination room, and various apparatuses and equipment placed in the examination room; disinfection of routes traveled (so-called lines of traffic) in the examination room; and disinfection of routes travelled to the examination room.

Specifically, in a case where the disinfection management apparatus 50 has received an instruction to shift to the disinfection mode from a user, the disinfection management apparatus 50 controls the disinfection apparatus 2 to execute the disinfection of the general radiographic apparatus 1. Configurations of and operation by the disinfection management apparatus 50 and the general radiographic apparatus 1 will be described in detail later.

In accordance with the control by the disinfection management apparatus 50, the disinfection apparatus 2 executes the disinfection of the general radiographic apparatus 1. The disinfection apparatus 2 is, for example, an ultraviolet irradiation apparatus installed on the floor, ceiling, and/or wall of the examination room. The disinfection apparatus 2 may be any apparatus that executes disinfection in the examination room in accordance with the control by the disinfection management apparatus 50. For example, the disinfection apparatus 2 may be self-propelled or robotic.

In the present specification, disinfection refers to deadening (or removing) pathogenic bacteria, viruses, and other microorganisms that are present in a target to the level where they cause no harm. Furthermore, disinfection may be read as eradication, germicidal treatment, or sterilization. Eradication refers to reducing the numbers/amounts of bacteria, viruses, and other microorganisms that are present in targets.

Germicidal treatment refers to deadening (deactivating) bacteria, viruses, and other microorganisms that are present in targets. Sterilization refers to deadening all of bacteria, viruses, and other microorganisms that are present in targets, regardless of whether the bacteria, viruses, and other microorganisms are harmful or harmless.

The medical interview doctor terminal 6 is, for example, a computer installed in a consultation room, and generates examination order information related to an examination of a patient, in accordance with input operation by a medical interview doctor, the examination using the general radiographic apparatus 1. The medical interview doctor terminal 6 transmits the examination order information generated, to the radiology department information server apparatus 7 via the network N.

The examination order information is information including, in addition to information identifying the patient (patient ID information) and examination reservation information (for example, the examination date and time), information including: the examination purpose (examination type); information identifying the X-ray diagnostic apparatus to be used; the imaging conditions (the tube voltage and tube current); the imaged region (the diagnosed region); and the posture/postures to be taken by the patient in the imaging.

The medical interview doctor terminal 6 may be a mobile terminal (such as a notebook computer or a tablet computer).

The radiology department information server apparatus 7 is a computer apparatus that executes processing related to information management in radiology information systems, also referred to as "RIS". A RIS is an information system that manages information in a radiology department of a hospital. The radiology department information server apparatus 7 may also be referred to as an RIS server.

The radiology department information server apparatus 7 receives, for example, the examination order information from the medical interview doctor terminal 6 via the network N. The radiology department information server apparatus 7 transmits the examination order information to the general radiographic apparatus 1 identified by the examination order information. In transmitting the examination order information to the general radiographic apparatus 1, the radiology department information server apparatus 7 may add the patient ID information and examination reservation information into a digital imaging and communications in medicine (DICOM) tag, for example.

The electronic medical record server apparatus 8 is a computer apparatus that executes processing related to information management in an electronic medical record system. The electronic medical record system is an information system that manages electronic medical records for recording medical care provided, and is part of hospital information systems, also referred to as "HIS". The electronic medical record server apparatus 8 may simply be referred to as an electronic medical record server.

An electronic medical record of a patient includes, in addition to information identifying the patient (patient ID information) and additional information related to the patient (such as the name, gender, height, and weight), for example: information related to the state of health of the patient; information related to symptoms; information related to examinations (such as the examination history and examination results); information related to diagnoses (the diagnosis history and diagnoses); information related to prescribed medicine (such as medicine prescribed in the past and medicine prescribed presently); information related to the case history; and information related to the treatment history.

The electronic medical record server apparatus 8 manages the electronic medical record of each patient. For example, the electronic medical record server apparatus 8 records information input to the electronic medical record of a patient at the medical interview doctor terminal 6. Furthermore, in response to a request from the disinfection management apparatus 50, the electronic medical record server apparatus 8 transmits the electronic medical record (or at least part of information included in the electronic medical record) of a relevant patient, to the disinfection management apparatus 50.

A configuration of the disinfection management apparatus 50 and a configuration of the general radiographic apparatus 1 including the disinfection management apparatus 50 will be described in detail next. The general radiographic apparatus 1 according to the embodiment is configured so that an X-ray tube and an X-ray detector move in association with each other to maintain the positional relation between the center of the X-ray tube and the X-ray detector.

Figure 2:
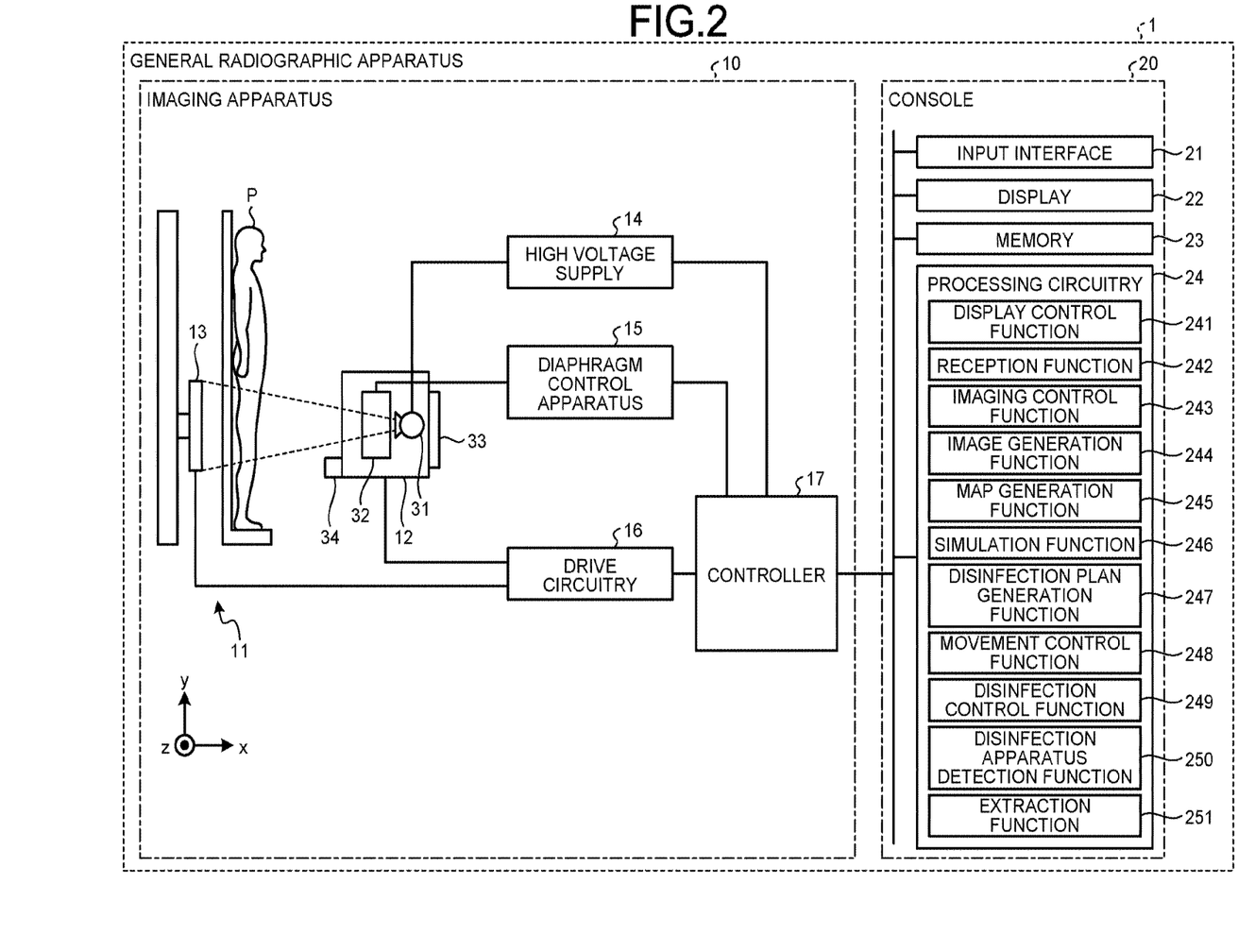
FIG. 2 is a block diagram illustrating an example of a configuration of the X-ray diagnostic apparatus according to the embodiment.
Figure 3:
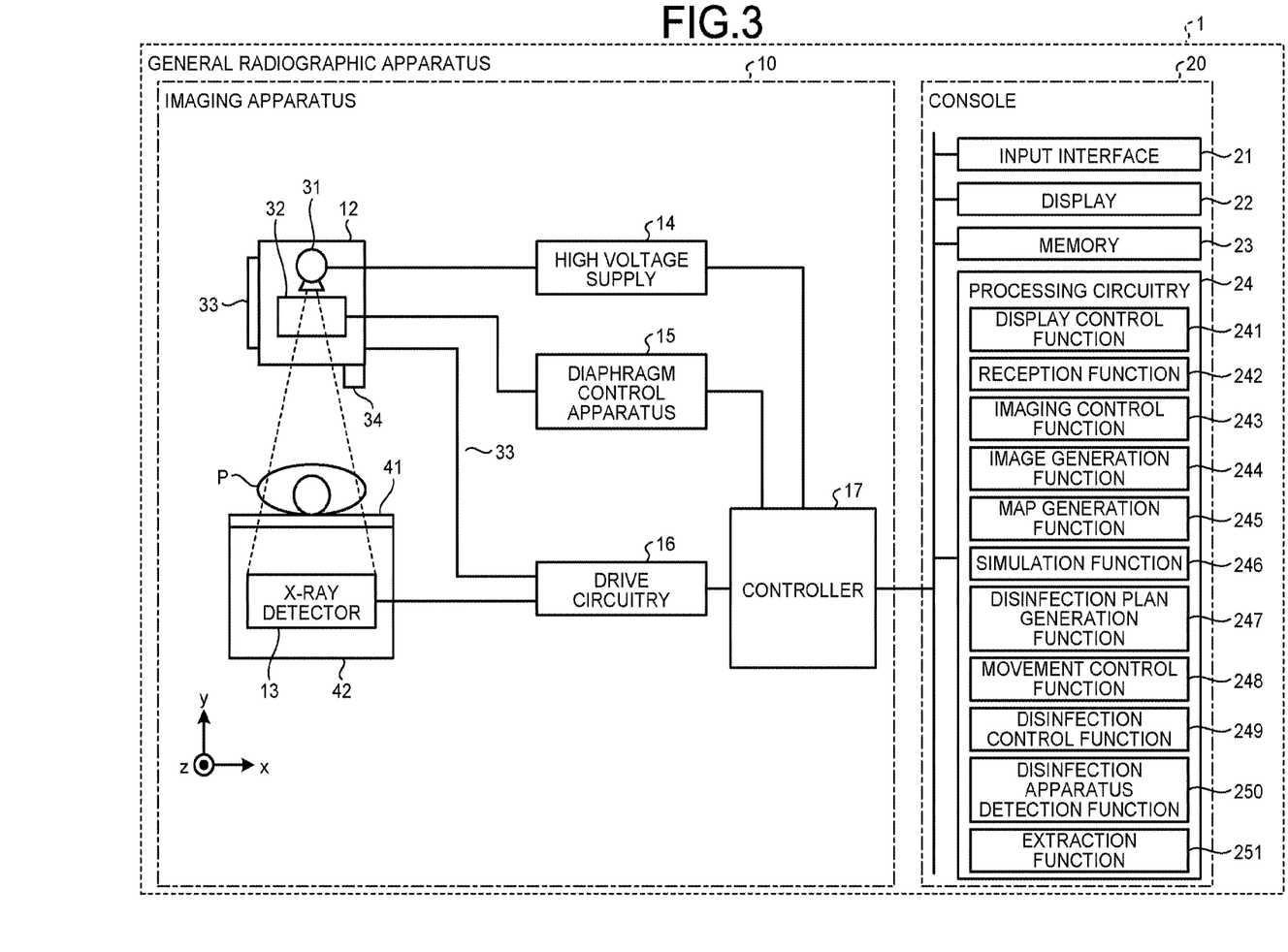
FIG. 3 is a block diagram illustrating an example of another configuration of the X-ray diagnostic apparatus according to the embodiment.

FIG. 2 is a block diagram illustrating an example of a configuration of the X-ray diagnostic apparatus according to the embodiment. Furthermore, FIG. 3 is a block diagram illustrating an example of another configuration of the X-ray diagnostic apparatus. FIG. 2 is an example of a configuration of the general radiographic apparatus 1 in a case where a subject P in a standing posture is radiographed, and FIG. 3 is an example of a configuration of the general radiographic apparatus 1 in a case where a subject P in a lying posture is radiographed.

As illustrated in FIG. 2 and FIG. 3, the general radiographic apparatus 1 has an imaging apparatus 10 and a console 20. The imaging apparatus 10 is an example of the radiographic unit. In the case where the subject P in the standing posture is radiographed, as illustrated in FIG. 2, the imaging apparatus 10 has a stand 11, an X-ray tube retaining apparatus 12, an X-ray detector 13 supported movably in relation to the stand 11, a high voltage supply 14, a diaphragm control apparatus 15, drive circuitry 16, and a controller 17.

By contrast, in the case where the subject P in the lying posture is radiographed, as illustrated in FIG. 3, the imaging apparatus 10 has, instead of the stand 11, a couch 42 including a couchtop 41 where the subject P is placed. The couchtop 41 moves up and down by being controlled by the controller 17 via the drive circuitry 16. Similarly, the couchtop 41 moves longitudinally (along a Z axis).

The X-ray tube retaining apparatus 12 of the imaging apparatus 10 has an X-ray tube 31, a diaphragm 32, an operation panel 33, and a camera 34.

In the case where the subject P in the standing posture is radiographed, as illustrated in FIG. 2, the subject P in a standing state is positioned in front of the stand 11. The X-ray tube retaining apparatus 12 and the X-ray detector 13 are capable of moving in association with each other to maintain the positional relation between the center of the X-ray tube 31 and the X-ray detector 13, by being controlled by the controller 17 via the drive circuitry 16. For example, the X-ray detector 13 supported by the stand 11 moves along the stand 11 in association with movement of the X-ray tube retaining apparatus 12 to maintain the state where the center of the X-ray tube 31 and the approximate center of the X-ray detector 13 are opposed to each other.

Furthermore, in the case where the subject P in the lying posture is radiographed, as illustrated in FIG. 3, the subject P in a lying state is placed on the couchtop 41. In this case also, similarly to the case of imaging in the standing posture, the X-ray tube retaining apparatus 12 and the X-ray detector 13 are capable of moving in association with each other to maintain the positional relation between the center of the X-ray tube 31 and the X-ray detector 13, by being controlled by the controller 17 via the drive circuitry 16.

The X-ray detector 13 is a flat panel detector (FPD) having plural X-ray detection elements arranged two-dimensionally, detects X-rays transmitted through the subject P and entering the X-ray detector 13, and outputs, on the basis of the X-rays detected, projection data on the X-rays. The projection data are provided to the console 20 via the controller 17. The X-ray detector 13 may include an image intensifier and/or a TV camera, for example.

The X-ray tube 31 is a vacuum tube that emits thermions from a cathode (a filament) to an anode (a target) by application of high voltage from the high voltage supply 14. The X-ray tube 31 is arranged opposite to the X-ray detector 13 with the subject P interposed between the X-ray tube 31 and the X-ray detector 13. Furthermore, the X-ray tube 31 moves in association with movement of the X-ray detector 13 to maintain the state where the center of the X-ray tube 31 and the approximate center of the X-ray detector 13 are opposed to each other, by being controlled by the controller 17 via the drive circuitry 16.

The high voltage supply 14 is electric circuitry including a transformer and a rectifier, and includes: a high voltage generation apparatus having a function of generating high voltage to be applied to the X-ray tube 31; and an X-ray control apparatus that performs control of output voltage according to X-rays emitted by the X-ray tube 31.

The diaphragm 32 has plural blades formed of metal that blocks X-rays, the metal being, for example, lead. The diaphragm 32 has a mechanism that adjusts the irradiation field of X-rays generated by the X-ray tube 31. The diaphragm 32 adjusts the range irradiated with X-rays emitted from the X-ray tube 31 by being controlled by the controller 17 via the diaphragm control apparatus 15.

The operation panel 33 is provided on a casing of the X-ray tube retaining apparatus 12 and has: hardware keys, such as buttons, that respectively provide specific instruction signals to a processor when pressed by a user; and a display input apparatus. The display input apparatus has a display, and a touch sensor provided near the display.

The display of the operation panel 33 displays an image indicating information related to the general radiographic apparatus 1 and various images, such as a reference image of the subject P captured by the camera 34. Furthermore, a user is able to input various instructions related to an image displayed on the display, into the general radiographic apparatus 1 via the touch sensor and/or hardware keys of the operation panel 33. The operation panel 33 outputs signals corresponding to the input by the user, to processing circuitry 24 of the console 20.

The camera 34 is provided on the casing of the X-ray tube retaining apparatus 12. The camera 34 includes a charge coupled device (CCD) image sensor or a complementary metal oxide semiconductor (CMOS) image sensor. The camera 34 takes in an image of the subject P positioned at the stand 11 in the standing posture or the subject P placed on the couchtop 41 in the lying posture, and outputs the image taken in, to the processing circuitry 24 of the console 20 via the controller 17. A wide-angle lens or a fish-eye lens may be attached to the camera 34 to enable acquisition of a camera image of a wider range of the subject P. Furthermore, the camera 34 may be provided on a wall surface including the ceiling of the examination room.

The controller 17 has at least a processor and a memory. The controller 17 is controlled by the console 20 according to a program stored in the memory and controls the components of the imaging apparatus 10 integrally. For example, by controlling an X-ray irradiation system, the controller 17 executes long-size imaging for generating a long-size image of the subject P to generate projection data, and outputs the projection data to the console 20.

The console 20 has an input interface circuitry 21, a display 22, a memory 23, and the processing circuitry 24. In this embodiment, the console 20 is installed outside the examination room. The console 20 may be not provided independently, and for example, the operation panel 33 of the imaging apparatus 10 may have functions of the input interface circuitry 21 and display 22 of the console 20, and the memory and processor of the controller 17 of the imaging apparatus 10 may respectively have functions of the memory 23 and the processing circuitry 24.

The input interface circuitry 21 of the console 20 includes, for example: a general pointing device, such as a joystick, a trackball, a trackball mouse, a keyboard, a touch panel, or a numeric keypad; and a hand switch for instructing the X-ray exposure timing, and the input interface circuitry 21 outputs an operation signal corresponding to operation by a user, to the processing circuitry 24.

The display 22 is a general display output apparatus, such as, for example, a liquid crystal display or an organic light emitting diode (OLED) display, and displays various types of information according to control by the processing circuitry 24.

The memory 23 is implemented by, for example: a semiconductor memory element, such as a random access memory (RAM) or a flash memory; a hard disk; or an optical disk. For example, the memory 23 stores projection data. Furthermore, for example, the memory 23 stores a disinfection plan associating the positional relation between the movable unit and the disinfection apparatus 2, with the time period of disinfection by the disinfection apparatus 2. This disinfection plan will be described later.

Furthermore, the memory 23 stores dedicated programs for implementing a display control function 241, a reception function 242, an imaging control function 243, an image generation function 244, a map generation function 245, a simulation function 246, a disinfection plan generation function 247, a movement control function 248, a disinfection control function 249, a disinfection apparatus detection function 250, and an extraction function 251, which will be described later.

The processing circuitry 24 controls the overall operation of the general radiographic apparatus 1. The processing circuitry 24 has, for example, the display control function 241, the reception function 242, the imaging control function 243, the image generation function 244, the map generation function 245, the simulation function 246, the disinfection plan generation function 247, the movement control function 248, the disinfection control function 249, the disinfection apparatus detection function 250, and the extraction function 251.

In this embodiment, processing functions implemented by the components, the display control function 241, the reception function 242, the imaging control function 243, the image generation function 244, the map generation function 245, the simulation function 246, the disinfection plan generation function 247, the movement control function 248, the disinfection control function 249, the disinfection apparatus detection function 250, and the extraction function 251, are stored in the form of programs executable by a computer, in the memory 23.

The processing circuitry 24 is a processor that implements functions corresponding to the programs by reading and executing the programs from the memory 23. In other words, the processing circuitry 24 that has read the programs has the functions illustrated inside the processing circuitry 24 in FIG. 2.

The processing functions executed by the display control function 241, the reception function 242, the imaging control function 243, the image generation function 244, the map generation function 245, the simulation function 246, the disinfection plan generation function 247, the movement control function 248, the disinfection control function 249, the disinfection apparatus detection function 250, and the extraction function 251 are implemented at the single processing circuitry 24 in FIG. 2, but the processing circuitry 24 may be formed of a combination of plural independent processors, and the functions may be implemented by these processors executing the programs.

In other words, each of these functions is configured as a program, and single processing circuitry may execute each of these programs, or a specific function may be implemented by dedicated independent program execution circuitry.

The term, "processor", used in the description above means, for example, a central processing unit (CPU) or a graphical processing unit (GPU); or circuitry, such as an application specific integrated circuit (ASIC) or a programmable logic device (for example, a simple programmable logic device (SPLD), a complex programmable logic device (CPLD), or a field programmable gate array (FPGA)).

The processor implements its functions by reading and executing the programs stored in the memory 23. Instead of being stored in the memory 23, the programs may be directly incorporated in circuitry of the processor. In this case, by reading and executing the programs incorporated in the circuitry, the processor implements the functions.

The display control function 241 performs control to display various types of information on the display 22. The information displayed on the display 22 by the display control function 241 will be described later.

The reception function 242 receives various instructions from a user. For example, the reception function 242 receives an imaging instruction from the user via the input interface circuitry 21. Furthermore, for example, the reception function 242 receives an instruction to shift to the disinfection mode from the user via the input interface circuitry 21. The instruction to shift to the disinfection mode is performed by the user pressing a button for a shift to the disinfection mode, the button being provided on the console 20, or the user clicking a button for a shift to the disinfection mode with a mouse, the button being displayed on the display 22.

The disinfection mode may have plural modes with different ultraviolet doses according to intended uses. For example, the disinfection mode may include a daily mode, a thorough mode, an urgent mode, and a postoperative mode. For example, the daily mode is a mode used for disinfection that is carried out routinely. Furthermore, for example, the thorough mode is a mode for disinfection more thorough than that in the daily mode. In this thorough mode, the whole general radiographic apparatus 1 including parts that are not disinfected in the daily mode is disinfected with an ultraviolet dose higher than that in the daily mode.

Furthermore, for example, the urgent mode is a mode where disinfection is performed urgently and only parts of the configuration of the general radiographic apparatus 1 are disinfected with the minimum required ultraviolet dose, the parts being parts frequently touched by people (a medical worker who operates the general radiographic apparatus 1 and a subject P). Furthermore, for example, the postoperative mode is a mode where disinfection is performed after an operation and any part likely to be contaminated after the operation is disinfected more elaborately than in the daily mode. Provision of these plural disinfection modes enables efficient disinfection in accordance with the intended use.

Furthermore, performing disinfection in a state where a person is in the examination room may be harmful to the person in the examination room. Therefore, in response to an instruction for a shift to the disinfection mode from a user, the display control function 241 displays a message prompting the user to confirm that no one is in the examination room. A human detecting sensor may be provided in the examination room and in a case where the human detecting sensor detects a person, the shift to the disinfection mode may be disabled. Furthermore, in this case, if a person is detected during execution of the disinfection mode, the disinfection mode may be stopped.

The imaging control function 243 performs radiography of a subject P by controlling the X-ray tube 31, the X-ray detector 13, and the diaphragm 32. Specifically, in a case where the imaging control function 243 has received an imaging instruction from a user, the imaging control function 243 moves, in cooperation with the movement control function 248 described later, the center of the X-ray tube 31 to a position corresponding to a region to be imaged of the subject P, and controls the X-ray tube 31, the X-ray detector 13, and the diaphragm 32 to perform radiography of the subject P at that position.

Furthermore, in a case where long-size imaging is to be performed, the imaging control function 243 moves, in cooperation with the movement control function 248, the center of the X-ray tube 31 to positions respectively corresponding to plural imaging regions included in the imaging range of a long-size image, to perform radiography.

The image generation function 244 generates an X-ray image on the basis of radiography. For example, in a case where long-size imaging has been performed, the image generation function 244 generates a long-size image on the basis of radiography performed at each of plural imaging regions. X-ray images and long-size images generated by the image generation function 244 are stored in the memory 23.

The map generation function 245 generates disinfection maps. A disinfection map represents, by an image, the level of disinfection required for disinfection of each part of the general radiographic apparatus 1 (for example, the ultraviolet dose). For example, the map generation function 245 makes an estimation of an ultraviolet dose required, from the amount of microorganisms (such as viruses and bacteria) expected to be present in the examination room, and generates a disinfection map before execution of the disinfection mode, on the basis of the estimation.

The map generation function 245 may capture an image inside the examination room with a camera, such as the camera 34, and generate a disinfection map on the basis of a result of this capturing of the image. In this case, for example, a part that is able to be confirmed, from the image captured, to be frequently touched by a subject P is estimated to require a larger ultraviolet dose for disinfection, and a disinfection map visualizing that level is generated. As described above, generating a disinfection map on the basis of an image captured inside the examination room enables generation of a more detailed disinfection map.

Figure 4:
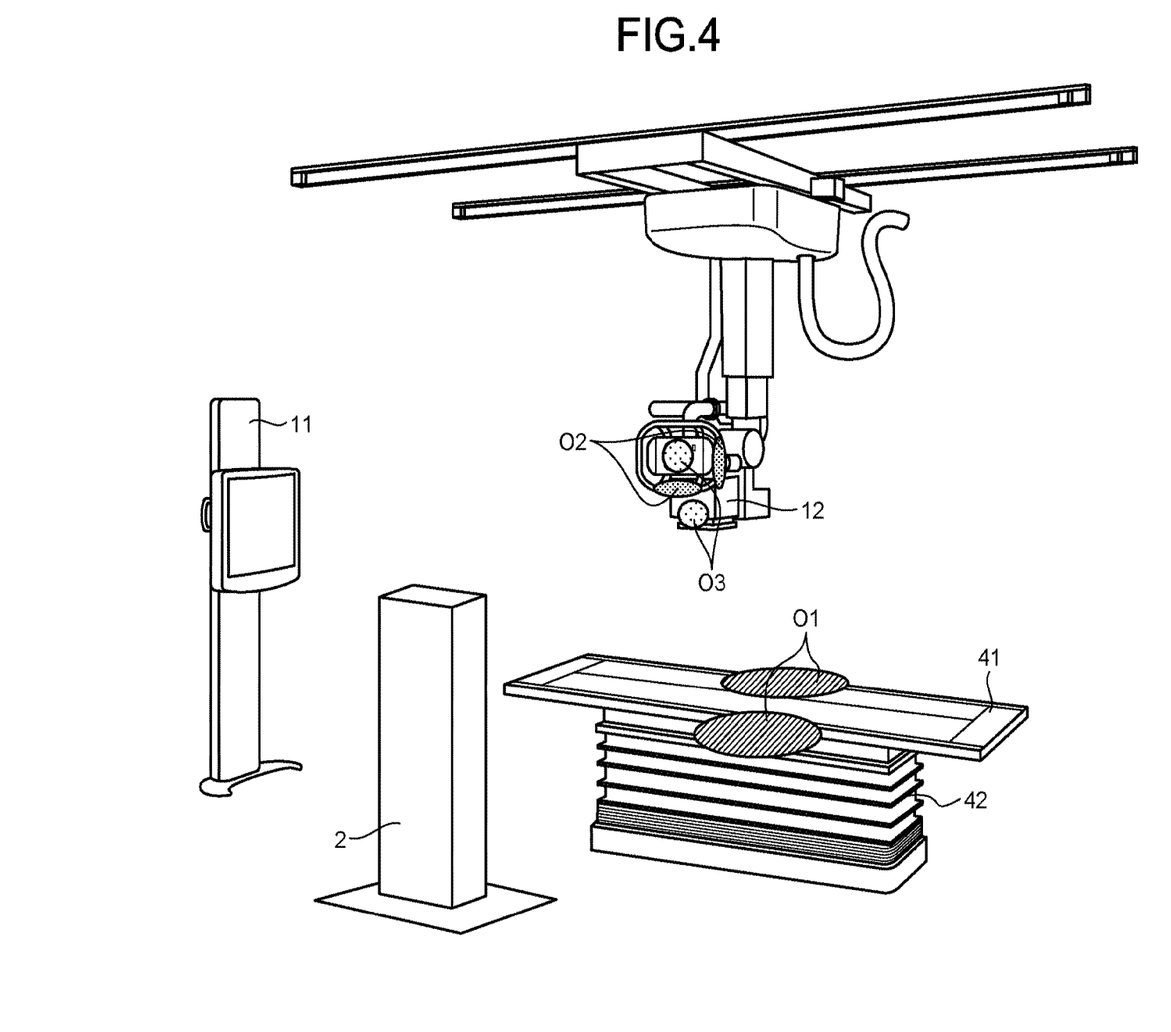
FIG. 4 is a diagram illustrating an example of a disinfection map before execution of a disinfection mode according to the embodiment.

FIG. 4 is a diagram illustrating an example of a disinfection map before execution of the disinfection mode. In this example, the disinfection apparatus 2 is included in the disinfection map but the disinfection apparatus 2 may be excluded. Furthermore, FIG. 4 illustrates a disinfection map for a case where the number of disinfection apparatuses 2 used is one, but plural disinfection apparatuses 2 may be used instead.

In FIG. 4, a region O1, a region O2, and a region O3 represent parts that have been touched by a user (for example, a medical doctor or a radiologist) and a subject P. The region O1 is a part on the couchtop 41, the part having been touched by the hands of the subject P. The region O2 and the region O3 are a part for manual movement of the X-ray tube retaining apparatus 12 and a part that has been touched by the hands of the user, such as the operation panel 33.

An image identifiably representing the ultraviolet doses required for disinfection is displayed superimposed on the region O1, the region O2, and the region O3. In this example, the disinfection map indicates that the relation among the ultraviolet doses required for disinfection of these regions is "region O1>region O2>region O3". FIG. 4 illustrates the ultraviolet doses required for disinfection in three levels but the embodiment is not limited to this example.

The simulation function 246 determines a positional relation of the movable unit to the disinfection apparatus 2 during disinfection of a part to be disinfected, and a disinfection time period, on the basis of the position and characteristics of the disinfection apparatus 2, and the part to be disinfected. The part to be disinfected is a region to be disinfected using the disinfection apparatus 2. In this embodiment, parts to be disinfected are parts of the general radiographic apparatus 1.

Parts to be disinfected may be limited to contacted parts of the parts of the general radiographic apparatus 1, the contacted parts being parts that come in contact with human bodies (a user and a subject P). Furthermore, parts to be disinfected may be limited to contacted parts that have been contacted by the subject P to be radiographed. Parts to be disinfected may be set beforehand, or set on the basis of analysis of an image captured by a camera, such as the camera 34, the image showing actions of a user and/or a subject P, for example.

For example, the simulation function 246 may run a simulation for disinfection efficacy from a disinfection map generated by the map generation function 245, the installation position of the disinfection apparatus 2 that executes disinfection of the general radiographic apparatus 1, the position of the movable unit, and the characteristics of the disinfection apparatus 2 (such as the ultraviolet intensity and wavelength).

More specifically, by using a three-dimensional model of the general radiographic apparatus 1, the simulation function 246 makes an analysis (a prediction), on the basis of the above mentioned information, such as the installation position of the disinfection apparatus 2, on how long in time each part to be disinfected is required to be irradiated with ultraviolet light for the part to be disinfected sufficiently. In a case where the ultraviolet irradiation conditions (for example, the wavelength and irradiation intensity) at the disinfection apparatus 2 are changeable, the time period required for disinfection of each part to be disinfected may be analyzed for each set of irradiation conditions.

The simulation function 246 may run a simulation including spatial fluid calculation, for example. An existing technique may be used for a simulation of an ultraviolet dose.

The simulation function 246 then determines a positional relation of the movable unit to the disinfection apparatus 2 for disinfection of the part to be disinfected, and a disinfection time period, on the basis of a result of the analysis. Furthermore, the simulation function 246 determines, for each part to be disinfected, a pair of the positional relation of the movable unit to the disinfection apparatus 2 for disinfection of the part to be disinfected, and the disinfection time period, the pair being related to the disinfection of the part to be disinfected.

The disinfection plan generation function 247 generates a disinfection plan on the basis of the positional relation and disinfection time period determined by the simulation function 246. For example, on the basis of the pair determined by the simulation function 246, the disinfection plan generation function 247 generates a disinfection plan prescribing the position of the movable unit (for example, the X-ray tube retaining apparatus 12, the X-ray detector 13, and the couchtop 41) and disinfection time period.

The position of the movable unit is information indicating the positional relation between the movable unit of the general radiographic apparatus 1 and the disinfection apparatus 2. Plural positions may be stored as relative position information in the memory 23 beforehand. In this case, on the basis of a result of the analysis, the simulation function 246 determines the disinfection time period for each position. The disinfection plan generation function 247 then generates a disinfection plan prescribing disinfection time periods for the respective positions.

Specifically, the disinfection plan generation function 247 generates a disinfection plan on the basis of: a position of the disinfection apparatus 2 in relation to the general radiographic apparatus 1, the position having been detected by the disinfection apparatus detection function 250 described later; a result of a simulation of an ultraviolet dose, the simulation having been run by the simulation function 246; and the type of the disinfection mode (such as the thorough mode). Furthermore, the disinfection plan generation function 247 sets the disinfection sequence for execution of the disinfection plan, on the basis of the priority sequence of disinfection.

The priority sequence is information indicating degrees of priority of parts to be disinfected, for example, indicating that "the couchtop 41 has the highest priority and the X-ray tube retaining apparatus 12 is disinfected next". Standards for defining the degrees of priority are not particularly limited and the degrees of priority may be defined according to any standard. For example, the degrees of priority may be defined on the basis of a result of counting of the number of times each part of the general radiographic apparatus 1 has been touched by a user and a subject P. In this case, the higher the number of times of touch by the user and the subject P is, the higher the degree of priority. In this embodiment, the degrees of priority are defined beforehand and stored in the memory 23, for example.

Furthermore, the degrees of priority may be dynamically determined by analysis of images representing actions by a user and a subject P, the images having been captured by a camera, such as the camera 34, every time a disinfection plan is generated. In this case, for example, in generating the disinfection plan, the higher the number of times a part has been touched by the user and the subject P is, the higher the degree of contamination is estimated to be, and a part that has been estimated to be higher in degree of contamination is regarded as a part to be disinfected higher in degree of priority.

Furthermore, for example, the degrees of priority may be defined on the basis of a simulation result from the simulation function 246. In this case, for example, the degrees of priority are set such that a part to be disinfected that has been analyzed by the simulation function 246 to require a longer time period for disinfection has a higher degree of priority.

Figure 5:
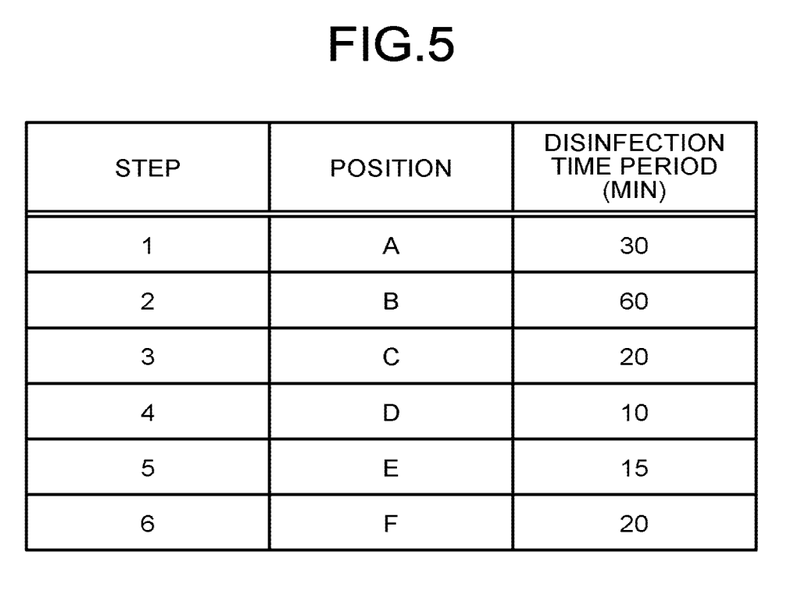
FIG. 5 is a diagram illustrating an example of a disinfection plan according to the embodiment.

Disinfection plans will be described hereinafter by use of FIG. 5. FIG. 5 is a diagram illustrating an example of a disinfection plan. In FIG. 5, "Step" indicates the sequence in which the movable unit is moved. Furthermore, "Position" indicates the positional relation between the movable unit in the general radiographic apparatus 1 and the disinfection apparatus 2.

Furthermore, "Disinfection time period" indicates the time period over which the movable unit is retained in the corresponding position. On the basis of the priority sequence and a simulation result from the simulation function 246, the disinfection plan generation function 247 generates a disinfection plan that enables efficient disinfection.

For example, the disinfection plan generation function 247 determines, on the basis of the simulation result from the simulation function 246, the position of the movable unit and the disinfection time period at that position. Furthermore, in a case where there are plural parts to be disinfected, the disinfection sequence indicating the sequence in which the movable unit is moved to the determined positions is determined on the basis of the priority sequence of the parts to be disinfected, for example.

The disinfection plan generation function 247 then generates a disinfection plan as illustrated in FIG. 5, on the basis of the determined positions of the movable unit, the disinfection time periods at those positions, and the disinfection sequence.

The disinfection plan generation function 247 may determine, on the basis of a simulation result from the simulation function 246, for example, as a "position", a relative position between the movable unit and the disinfection apparatus 2, the relative position being where the part to be disinfected is able to be disinfected efficiently.

The movement control function 248 controls movement of each unit of the general radiographic apparatus 1. For example, the movement control function 248 moves the movable unit of the general radiographic apparatus 1 to a position where the movable unit and the disinfection apparatus 2 have a predetermined positional relation to each other. Furthermore, by executing the disinfection plan in the disinfection sequence, the movement control function 248 sequentially moves the movable unit.

Specifically, in a case where the movement control function 248 has received an instruction to execute the disinfection mode from a user, the movement control function 248 moves, according to a disinfection plan stored in the memory 23, the movable unit to the position defined in the disinfection plan. For example, in the example in FIG. 5, the movement control function 248 moves the movable unit to a position A in a case where the movement control function 248 has received an instruction to shift to the disinfection mode from a user. After retaining the movable unit at the position A for 30 minutes, the movement control function 248 performs control to move the movable unit to a position B.

After the movable unit has been moved to the position defined in the disinfection plan by the movement control function 248, the disinfection control function 249 controls the disinfection apparatus 2 to perform disinfection.

For example, in the example in FIG. 5, the disinfection control function 249 receives an instruction to shift to the disinfection mode, from a user, and the movement control function 248 moves the movable unit to a predetermined position according to a disinfection plan and thereafter controls the disinfection apparatus 2 to execute disinfection by ultraviolet irradiation. The disinfection control function 249 may have the position of the disinfection apparatus 2 fixed regardless of the defined position or may change the position of the disinfection apparatus 2 according to the defined position.

Furthermore, in response to execution of the disinfection mode by the movement control function 248 and the disinfection control function 249, the simulation function 246 described above updates, in cooperation with the map generation function 245, the disinfection map, on the basis of a simulation result.

For example, for every step in the disinfection plan, on the basis of the actual ultraviolet dose from the disinfection apparatus 2, the simulation function 246 runs a simulation to find out which location has been irradiated with how much ultraviolet light. On the basis of a result of the simulation by the simulation function 246, the map generation function 245 generates (updates) a disinfection map reflecting a result of disinfection.

Furthermore, in a case where execution of the disinfection mode has been interrupted in response to an instruction from a user, for example, the simulation function 246 runs a simulation for an ultraviolet dose at the time of the interruption and updates the disinfection map. The user is thereby able to know the status of disinfection even if the disinfection mode is interrupted for any reason.

Furthermore, when disinfection is ended, when disinfection is interrupted, or in a case where an instruction is received from a user, the display control function 241 displays the disinfection map.

Figure 6:
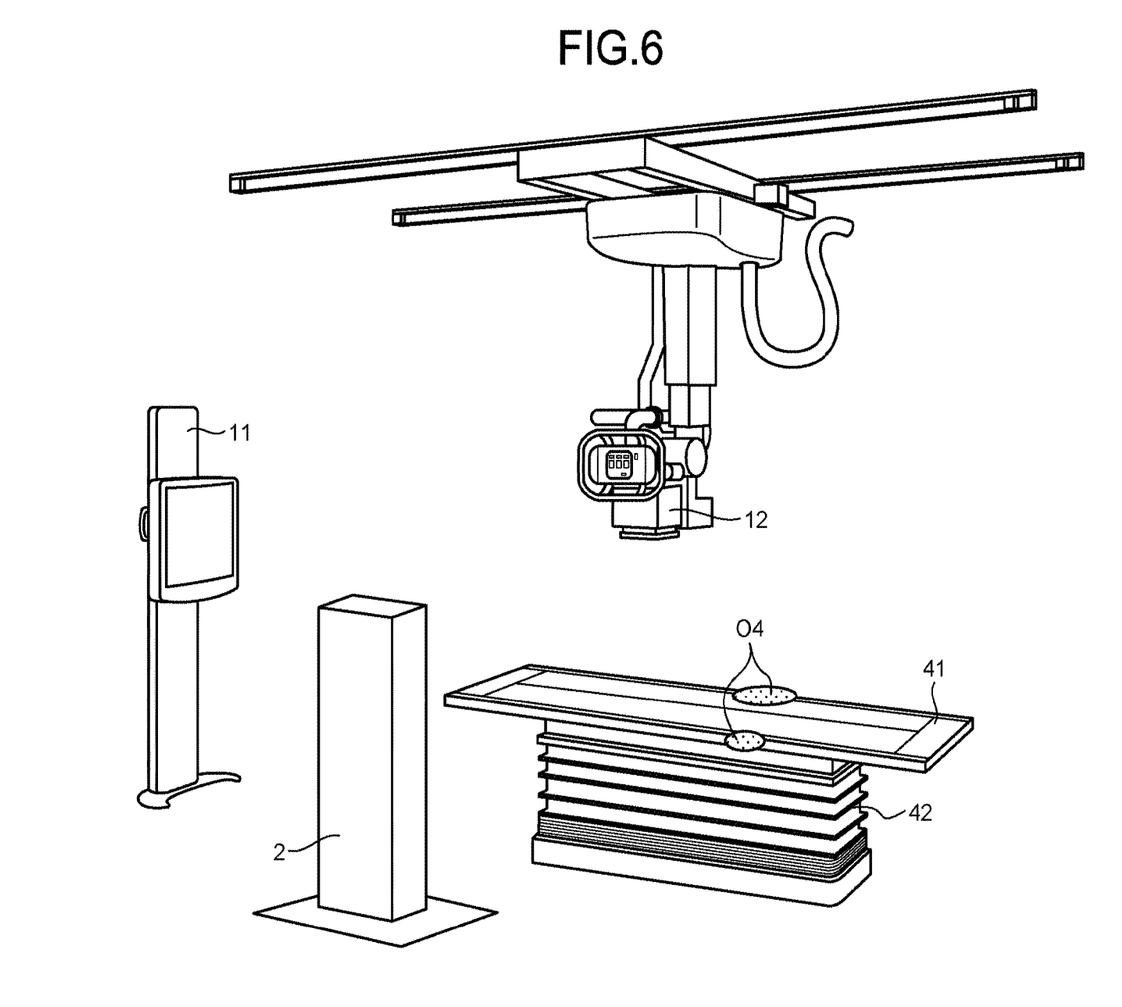
FIG. 6 is a diagram illustrating an example of the disinfection map after the execution of the disinfection mode according to the embodiment.

FIG. 6 is a diagram illustrating an example of a disinfection map after execution of the disinfection mode. This example illustrates that disinfection of the region O4 on the couchtop 41 is insufficient. Furthermore, a user is able to confirm that regions other than the region O4 have been disinfected, by checking the image displayed superimposed on the disinfection map, the image identifiably representing the ultraviolet doses required for disinfection.

Furthermore, from the image identifiably representing the ultraviolet doses required for disinfection, the user is also able to know visually how much ultraviolet irradiation of the region O4 is additionally required to reach the ultraviolet dose required for disinfection.

As described above, in a case where a region that has not been disinfected sufficiently is found at the time disinfection is ended as a result of a simulation by the simulation function 246, the display control function 241 displays a message on the display 22, the message warning that there is a region that has not been disinfected sufficiently. The display control function 241 may also display, together with the disinfection map, a message prompting the user to manually disinfect that region.

The disinfection apparatus detection function 250 detects the position of the disinfection apparatus 2 in relation to the general radiographic apparatus 1. The position of the disinfection apparatus 2 includes, for example, the orientation of an ultraviolet emission unit. For example, on the basis of an image of the examination room, the image having been captured by a camera, such as the camera 34, the disinfection apparatus detection function 250 may detect the position of the disinfection apparatus 2. Furthermore, for example, wireless communication may be performed between the general radiographic apparatus 1 and the disinfection apparatus 2, and the disinfection apparatus detection function 250 may detect the position of the disinfection apparatus 2 from the radio field intensity, for example.

Furthermore, before execution of the disinfection mode, the disinfection apparatus detection function 250 performs detection of the position of the disinfection apparatus 2, determines the positional relation between the movable unit and the disinfection apparatus 2 on the basis of a result of the detection, and determines whether or not the movable unit and the disinfection apparatus 2 have a predetermined positional relation to each other.

For example, in a case where the first position prescribed in a disinfection plan is a positional relation where the X-ray tube retaining apparatus 12 and the ultraviolet emission unit of the disinfection apparatus 2 face each other, the disinfection apparatus detection function 250 determines whether or not the disinfection apparatus 2 and the X-ray tube retaining apparatus 12 have a positional relation to each other where the X-ray tube retaining apparatus 12 and the ultraviolet emission unit of the disinfection apparatus 2 face each other when the movement control function 248 has moved the movable unit of the X-ray tube retaining apparatus 12 to the first position, for example.

In the above described example, the disinfection apparatus detection function 250 refers to the disinfection plan generated by the disinfection plan generation function 247 after the disinfection plan is generated by the disinfection plan generation function 247, and makes a determination of a positional relation between the movable unit and the disinfection apparatus 2, but the time when this determination is made is not limited to this example.

For example, the disinfection apparatus detection function 250 may determine whether or not the movable unit and the disinfection apparatus 2 have a predetermined positional relation to each other, immediately after the first position is determined by the disinfection plan generation function 247.

In a case where the disinfection apparatus detection function 250 has determined that the movable unit and the disinfection apparatus 2 do not have the predetermined positional relation to each other, the display control function 241 displays a warning message about that determination on the display 22. A warning sound may also be output from a speaker included in the console 20. A user is thereby able to respond by manually adjusting the position of the disinfection apparatus 2, for example.

Furthermore, in a case where the disinfection apparatus detection function 250 has determined that the movable unit and the disinfection apparatus 2 do not have the predetermined positional relation to each other, the movement control function 248 may move the movable unit to a position where the movable unit and the disinfection apparatus 2 have the predetermined positional relation to each other.

Furthermore, in a case where the disinfection apparatus detection function 250 has determined that the movable unit and the disinfection apparatus 2 do not have the predetermined positional relation to each other, the movement control function 248 and the disinfection control function 249 may be controlled so that the shift to the disinfection mode is not made.

In a case where it has been determined that the movable unit and the disinfection apparatus 2 have the predetermined positional relation to each other, the movement control function 248 moves the movable unit to the first position prescribed in the disinfection plan, on the basis of the positional relation between the movable unit and the disinfection apparatus 2, the positional relation having been determined by the disinfection apparatus detection function 250.

The extraction function 251 performs extraction of any high-risk patient likely to be affected with an infectious disease. For example, the extraction function 251 extracts any high-risk patient from a positive test result related to an infectious disease (for examples, a positive result of a PCR test for SARS-CoV-2) and a disinfection mode execution history that have been received from the electronic medical record server apparatus 8.

Specifically, the extraction function 251 extracts, as a high-risk patient, any subject P who is radiographed after a different subject P who was tested positive was radiographed and before the disinfection mode is executed. This is because any part touched by a subject P who has been tested positive is thought to be a part where a person is likely to be affected with that infectious disease when the person touches the part, and any subject P likely to have touched this part before disinfection is thought to have a higher risk of being affected with the infectious disease.

The disinfection plan generation function 247 may set the disinfection sequence on the basis of a result of extraction by the extraction function 251. For example, the disinfection plan generation function 247 may identify any part that has been touched by a high-risk patient extracted by the extraction function 251, from an image captured by a camera, such as the camera 34, and set the disinfection sequence to enable disinfection of the part preferentially.

Figure 7:
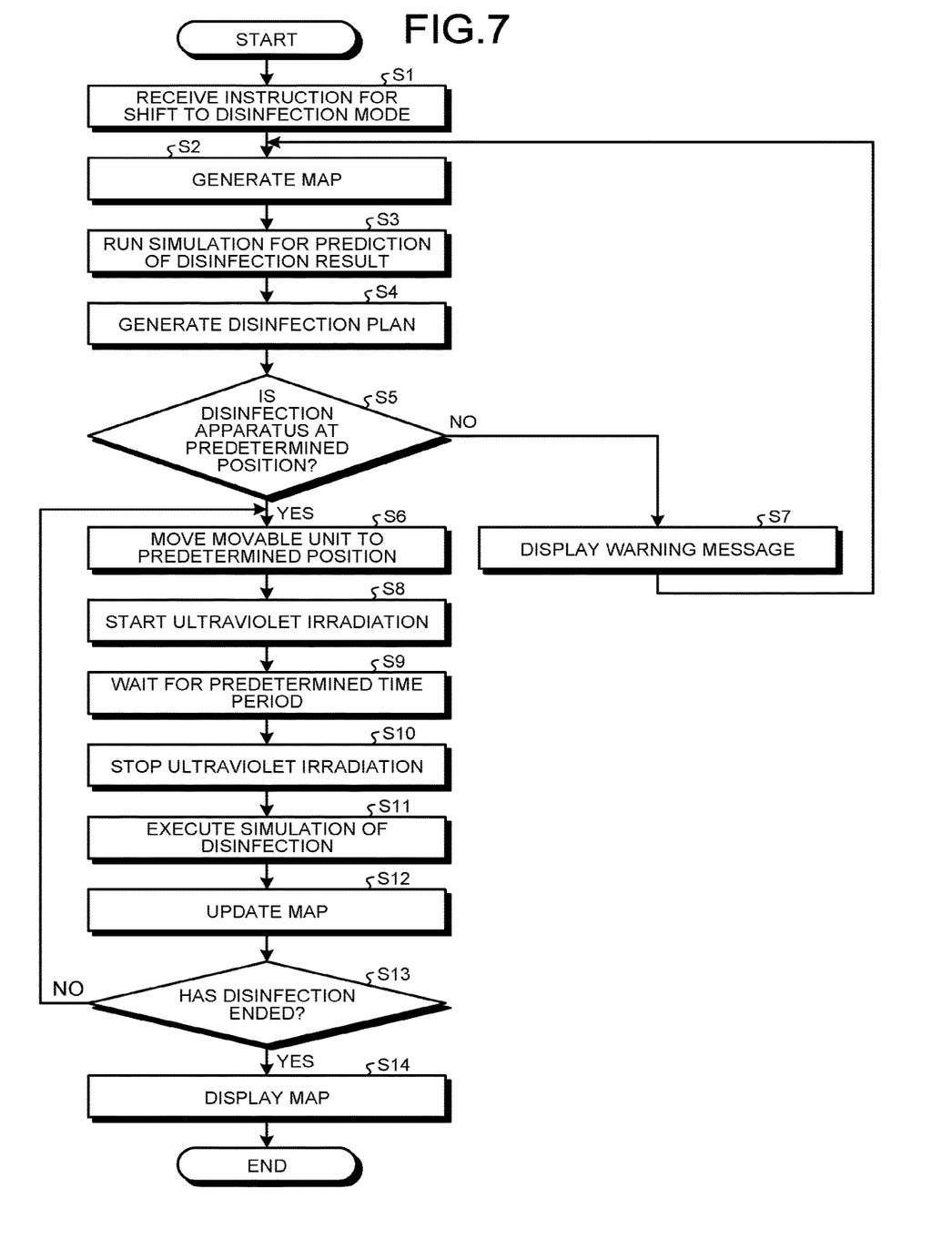
FIG. 7 is a flowchart illustrating an example of processing executed by the X-ray diagnostic apparatus according to the embodiment.

Processing executed by the general radiographic apparatus 1 will be described next. FIG. 7 is a flowchart illustrating an example of processing executed by the X-ray diagnostic apparatus according to the embodiment.

First of all, the reception function 242 receives an instruction to shift to the disinfection mode, from a user (Step S1). The map generation function 245 then generates a disinfection map (Step S2). Subsequently, the simulation function 246 runs a simulation to analyze a time period needed for disinfection of each part of the general radiographic apparatus 1 (Step 3). On the basis of the disinfection mode and a result of the simulation, for example, the disinfection plan generation function 247 generates a disinfection plan (Step S4). Furthermore, the disinfection plan generation function 247 sets the disinfection sequence, on the basis of the priority sequence of disinfection.

Subsequently, the disinfection apparatus detection function 250 detects the position of the disinfection apparatus 2 before executing the disinfection mode, refers to the disinfection plan generated by the disinfection plan generation function 247, and determines whether or not the movable unit and the disinfection apparatus 2 are in a predetermined positional relation (Step S5).

In a case where the movable unit and the disinfection apparatus 2 are not in the predetermined positional relation (Step S5: No), the display control function 241 displays a warning message indicating that they are not in the predetermined positional relation, on the display 22 (Step S7). Thereafter, the processing at Step S5 is repeated.

In contrast, in a case where the movable unit and the disinfection apparatus 2 are in the predetermined positional relation (Step S5: Yes), the movement control function 248 moves the movable unit to a position defined in the disinfection plan (Step S6). Subsequently, the disinfection control function 249 controls the disinfection apparatus 2 immediately after the processing at Step S3, to start ultraviolet irradiation (Step S8). The movement control function 248 retains the movable unit at the position for a predetermined time period defined in the disinfection plan (Step S9).

After the predetermined time period has elapsed, the disinfection control function 249 stops the ultraviolet irradiation (Step S10). Subsequently, the simulation function 246 runs a simulation for a disinfection result, on the basis of the ultraviolet irradiation actually performed by the disinfection apparatus 2 (Step S11). Subsequently, the simulation function 246 cooperates with the map generation function 245 to update the disinfection map on the basis of the simulation result (Step S12).

Subsequently, the movement control function 248 checks the disinfection plan and the disinfection sequence, and checks whether or not disinfection has ended (Step S13). In a case where the disinfection has not ended (Step S13: No), the movement control function 248 moves the movable unit to the next position according to the disinfection sequence (proceeds to the processing at Step S6).

In contrast, in a case where the disinfection has ended, the display control function 241 displays the disinfection map that has been updated by the simulation function 246 in cooperation with the map generation function 245, on the display 22, and ends the processing (Step S14).

As described above, the general radiographic apparatus 1 according to the embodiment includes: the movable unit, such as the X-ray tube retaining apparatus 12 that is movable; and the movement control function 248 that moves the movable unit to a position where the movable unit and the disinfection apparatus 2 that performs disinfection have a predetermined positional relation to each other.

Accordingly, the movement control function 248 moves the movable unit to a predetermined position so that the movable unit and the disinfection apparatus 2 are in the predetermined positional relation, and disinfection is thus able to be performed efficiently by control for movement of the movable unit to the position where efficient disinfection is possible. Furthermore, because automatic disinfection is enabled, a burden on a medical worker, such as a medical doctor or a radiologist, is able to be reduced.

Furthermore, the general radiographic apparatus 1 according to the embodiment includes: the simulation function 246 that performs analysis of the disinfection efficacy on the basis of the position of the disinfection apparatus 2, the contacted parts that have been contacted by a subject P, and disinfection conditions including at least characteristics of the disinfection apparatus 2 that performs disinfection; and the disinfection plan generation function 247 that generates, on the basis of a result of the analysis, a disinfection plan including information on the position of the movable unit.

A simulation of disinfection is thereby performed before execution of disinfection, and a disinfection plan for efficient disinfection is able to be generated from a result of the simulation. That is, the general radiographic apparatus 1 according to the embodiment enables efficient disinfection.

The embodiment described above may be implemented by modification through change of some of components or functions included in each apparatus, as appropriate. Some modified examples according to the embodiment described above will thus be described hereinafter as other embodiments. Points different from those of the embodiment described above will mainly be described hereinafter and detailed description of points that are the same as those described already will be omitted. Furthermore, the modified examples described hereinafter may be implemented individually or may be implemented in combination, as appropriate.

First Modified Example

In the above described embodiment, disinfection targets to be disinfected are parts of the general radiographic apparatus 1. However, the disinfection targets may include, not only parts of the general radiographic apparatus 1, but also structures that are present around the general radiographic apparatus 1. Such structures include structures constituting the examination room (for example, the walls, floor, and ceiling) and structures other than the general radiographic apparatus 1 and installed in the examination room (for example, a chair and a desk).

In this modified example, the movement control function 248 moves the movable unit so that the movable unit is not positioned between a structure to be disinfected and the disinfection apparatus 2. For example, in a case where a wall in the examination room is a part to be disinfected, the wall being shadowed by the X-ray tube retaining apparatus 12, the X-ray tube retaining apparatus 12 is moved so that the X-ray tube retaining apparatus 12 is not positioned between the wall and the disinfection apparatus 2.

According to this modified example, dead space hidden by the general radiographic apparatus 1 is able to be made a target to be disinfected by change in the position, for example. The overall interior of the examination room is thereby able to be disinfected evenly and efficiently.

Second Modified Example

In the above described embodiment, the position of the disinfection apparatus 2 is detected by the disinfection apparatus detection function 250 before execution of the disinfection mode, and in a case where the disinfection apparatus 2 is not at a predetermined position in relation to a part to be disinfected, a warning is output. However, instead of the output of a warning, control to move the disinfection apparatus 2 to an appropriate position may be performed.

In this modified example, in a case where the disinfection apparatus detection function 250 has determined that the movable unit and the disinfection apparatus 2 are not in a predetermined positional relation, the movement control function 248 performs control to move the disinfection apparatus 2 so that the movable unit and the disinfection apparatus 2 are in the predetermined positional relation.

There is thereby no need for a user to adjust the position of the disinfection apparatus 2 manually. That is, the general radiographic apparatus 1 according to this modified example enables: further reduction of a burden on the user; and efficient disinfection.

Third Modified Example

In the above described embodiment, a simulation of disinfection is performed before execution of the disinfection mode, a disinfection plan is generated on the basis of a result of the simulation, the disinfection sequence is set, and the disinfection mode is executed in accordance with the disinfection plan generated and the disinfection sequence set. However, a simulation of disinfection may be performed in real time on the basis of an actual ultraviolet dose, and the disinfection mode may be executed while the disinfection plan and the disinfection sequence are modified to enable more efficient disinfection.

In this modified example, the simulation function 246 obtains information related to disinfection from the disinfection apparatus 2 in real time while the disinfection mode is being executed, the information being, for example, the position irradiated with ultraviolet light and the ultraviolet dose, and executes a simulation for disinfection efficacy in real time on the basis of the information. Furthermore, the disinfection plan generation function 247 modifies the disinfection plan and the disinfection sequence, on the basis of a result of the simulation.

For example, in a case where the ultraviolet dose at a position has reached the required dose, the disinfection plan generation function 247 modifies the disinfection time period so that the movable unit is able to be moved to the next position even if the disinfection time period at that position has not elapsed.

This modified example enables modification of the disinfection time period and the disinfection sequence, according to the actual disinfection result, and thus enables more efficient disinfection.

Fourth Modified Example

In the above described third modified example, the disinfection mode is executed while the disinfection plan is modified in real time. However, the disinfection mode may be executed without generation of a disinfection plan.

In this modified example, in a case where the reception function 242 has received an instruction to execute the disinfection mode from a user, for example, the movement control function 248 moves the movable unit to a position of the highest priority, according to a predetermined priority sequence for disinfection. Subsequently, the disinfection control function 249 controls the disinfection apparatus 2 to start ultraviolet irradiation.

The simulation function 246 executes a simulation for a result of the ultraviolet irradiation in real time, similarly to the third modified example. In a case where it is determined that the required ultraviolet dose has been reached from a result of the simulation, the movement control function 248 moves the movable unit to a position of the second highest priority. The simulation function 246, the movement control function 248, and the disinfection control function 249 execute the disinfection mode by repeating the above described processing.

The required ultraviolet dose in this case may change depending on the disinfection mode. Furthermore, in this modified example, a past result of execution of the disinfection mode (for example, the sequence in which disinfection was performed, the time period taken for the movable unit to be moved to the next position, and the time period taken for the disinfection) may be referred to, and the movement control function 248 and the disinfection control function 249 may be controlled for the disinfection mode to be executed.

In this case, analyzing the past result of execution of the disinfection mode enables identification of the process where time was lost, and thereby enables, for example, the disinfection mode to be executed so that the movable unit moves more economically. Furthermore, accumulating results of execution of the disinfection mode is believed to enable efficient execution of the disinfection mode without the disinfection being insufficient, even if a simulation of disinfection in real time is omitted.

This modified examples enables execution of the disinfection mode without execution of a simulation beforehand.

Fifth Modified Example

In the above described embodiment, the disinfection apparatus 2 is an ultraviolet irradiation apparatus that performs disinfection by ultraviolet irradiation. However, the disinfection apparatus 2 is not limited to this example.

For example, the disinfection apparatus 2 may be an apparatus that generates ozone by emitting ultraviolet light to oxygen molecules in the air and performs disinfection with ozone. Furthermore, for example, the disinfection apparatus 2 may be a liquid spray apparatus that sprays a disinfectant, such as alcohol or a hypochlorous acid solution.

This modified example enables efficient disinfection by selection of an appropriate disinfection method depending on the kind of pathogen desired to be removed.

Sixth Modified Example

The X-ray diagnostic apparatus including the disinfection management apparatus 50, according to the embodiment, is not limited to the general radiographic apparatus 1, and may be, for example, an X-ray computed tomography (CT) apparatus, or an angio-CT system.

Seventh Modified Example

In the above described embodiment, the X-ray diagnostic apparatus (general radiographic apparatus 1) has functions of the disinfection management apparatus 50. However, a disinfection management apparatus 50 that is capable of communicating with an X-ray diagnostic apparatus may be implemented by a medical work station or a personal computer, for example. Such a disinfection management apparatus 50 is not necessarily installed in a hospital and may be installed in a facility outside the hospital or the cloud. Furthermore, the disinfection apparatus 2 may have the functions of the disinfection management apparatus 50.

At least the above described embodiment and modified examples enable efficient disinfection.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An X-ray diagnostic apparatus, comprising:
a radiographic unit that performs radiography;
a movable unit provided in the radiographic unit and movable to plural positions; and
processing circuitry that moves the movable unit to a position where the movable unit and a disinfection apparatus that performs disinfection have a predetermined positional relation to each other.

2. The X-ray diagnostic apparatus according to claim 1, wherein the processing circuitry
detects a position of the disinfection apparatus,
determines, on the basis of the detected position of the disinfection apparatus, a positional relation between the movable unit and the disinfection apparatus, and
moves the movable unit, on the basis of the determined positional relation between the movable unit and the disinfection apparatus, to the position where the movable unit and the disinfection apparatus have the predetermined positional relation to each other.

3. The X-ray diagnostic apparatus according to claim 2, wherein the processing circuitry makes a notification in a case where the determined positional relation between the movable unit and the disinfection apparatus is not the predetermined positional relation after the movable unit has been moved.

4. The X-ray diagnostic apparatus according to claim 1, further comprising:
a memory that stores a disinfection plan associating a positional relation of the movable unit to the disinfection apparatus, with a time period of disinfection by the disinfection apparatus, wherein
the processing circuitry retains the position of the movable unit for the time period of disinfection prescribed in the disinfection plan, after moving the movable unit on the basis of the disinfection plan.

5. The X-ray diagnostic apparatus according to claim 4, wherein the processing circuitry
determines, on the basis of a position and a characteristic of the disinfection apparatus and a contacted part contacted by a subject to be radiographed: a positional relation of the movable unit to the disinfection apparatus for disinfection of the contacted part; and a time period of the disinfection, and
generates the disinfection plan on the basis of the determined positional relation and the time period of the disinfection.

6. The X-ray diagnostic apparatus according to claim 5, wherein the processing circuitry
determines, for the contacted part, a pair of the positional relation and the time period of the disinfection that are related to the disinfection of the contacted part,
on the basis of the pair determined, generates the disinfection plan and sets disinfection sequence for execution of the disinfection plan, and
sequentially moves the movable unit by executing the disinfection plan in order of the disinfection sequence.

7. The X-ray diagnostic apparatus according to claim 1, wherein the processing circuitry moves the disinfection apparatus to a position where the movable unit and the disinfection apparatus have a predetermined positional relation to each other.

8. The X-ray diagnostic apparatus according to claim 1, wherein the processing circuitry controls the disinfection apparatus to perform disinfection after moving the movable unit or the disinfection apparatus.

9. The X-ray diagnostic apparatus according to claim 1, wherein the movable unit includes a part that comes into contact with a human body.

10. The X-ray diagnostic apparatus according to claim 1, wherein the processing circuitry moves the movable unit so that the movable unit is not positioned between the disinfection apparatus and a structure that is present around the X-ray diagnostic apparatus, in a case where the structure is to be disinfected.

11. The X-ray diagnostic apparatus according to claim 1, wherein the disinfection apparatus performs disinfection by ultraviolet irradiation.

* * * * *